United States Patent
Anderson et al.

[15] 3,660,200
[45] May 2, 1972

[54] PROCESS FOR BONDING PREHEATED THERMOPLASTIC FILM TO A DISSIMILAR SUBSTRATE

[72] Inventors: Robert E. Anderson, 108 LaSalle Drive, Richmond, Va. 23225; Augustus W. Bachman, Jr., Williamburg Court, Williamsburg, N.Y. 12250

[22] Filed: July 9, 1969

[21] Appl. No.: 845,650

Related U.S. Application Data

[63] Continuation of Ser. No. 572,260, Aug. 15, 1966, abandoned.

[52] U.S. Cl. ............................... 156/306, 156/151, 156/163, 156/322, 156/327
[51] Int. Cl. ............................................................ C09j 5/06
[58] Field of Search ............................ 156/79, 82, 151–154, 156/160, 202, 306, 322, 163, 327

[56] References Cited

UNITED STATES PATENTS

| | | |
|---|---|---|
| 2,877,151 | 3/1959 | Doherty et al. .......................... 156/322 |
| 2,880,542 | 4/1959 | Butterweich .............................. 161/5 |
| 3,111,418 | 11/1963 | Gilbert et al. ............................. 117/15 |
| 3,360,412 | 12/1967 | James .................................... 156/229 |

*Primary Examiner*—Carl D. Quarforth
*Assistant Examiner*—P. A. Nelson
*Attorney*—Donald L. Johnson

[57] ABSTRACT

The present process relates to a method and an apparatus for continuously thermally bonding layers of materials together so as to form a laminate from a composite which includes at least one layer of thermoplastic film and at least one layer of substrate. In particular, the present invention is of value for bonding together multiple layers of thermoplastic film and substrate to which have been imparted various decorative and utilitarian effects.

11 Claims, 3 Drawing Figures

PROCESS FOR BONDING PREHEATED THERMOPLASTIC FILM TO A DISSIMILAR SUBSTRATE

This application is a continuation-in-part of application Ser. No. 572,260, filed Aug. 15, 1966, now abandoned.

In the prior art it is recognized that film laminates are highly desirable since they are good moisture barriers and are resistant to attack by acids and bases and to penetration by gases such as oxygen, nitrogen and ammonia. The desirability of film laminates has led to the development of a wide variety of processes and apparatus for film laminate production. Such processes and apparatus have in general suffered from one or more faults. Due to the technical difficulties involved in producing film laminates, previous inventions thereto directed have been one or more of uneconomical, lacking in versatility, and/or productive of low quality laminates. That is, versatility has required elaborate and complicated processes and apparatus, thus necessitating high capital and maintenance expenditures with resultant loss in economy. On the other hand, economical processes of the prior art have proved low in versatility. In general, prior art inventions have not achieved products of the superiority equal to the potential of film laminates.

It is an object of the present invention to overcome the above noted disadvantages of the prior art. In particular, it is an object of the present invention to realize a versatile and economical process and apparatus which are productive of superior film laminates which are strongly resistant to delamination. Further objects and advantages of the present invention will become apparent in the following description.

The present invention is drawn to a method and apparatus for continuously thermally bonding layers of material together so as to form a laminate from a composite which may be either, first, a layer of thermoplastic film and a layer of substrate, secondly, at least two layers of thermoplastic film and at least one layer of substrate, and thirdly, at least two layers of substrate and at least one layer of thermoplastic film. The thermoplastic film and substrate may be either or both continuous or perforate; the substrate may consist of paper, paperboard, fabric, or metal foil, or other equivalent substances.

According to the method of the present invention at least the substrate, and if desired, also the film may be preheated prior to the laminating operation. The preheated layers of film and substrate are then passed between parallel and abutting nip rolls which encompass one notably inventive feature of the present invention. The surface of one of the two abutting nip rolls is relatively resilient while the surface of the other of the two abutting nip rolls is relatively rigid. One or both of the two abutting rolls have surface tensions approximately one-half the surface tension of the thermoplastic film. The nip rolls are pressed together so as to form a nip section whereat exists a pressure of from about 20 to about 80 pounds per square inch gauge. The abutting rolls are counter-rotated in order to pass the layers of film and substrate through the nip section. In the nip section the layers are thermally bonded and the laminate is formed. As a further processing step the laminate may be heated whereby gloss of the film is enhanced and bonding of the substrate to the film is improved.

The apparatus of the present invention is partially set forth in the above description of the process. In a preferred embodiment the above described nip rolls comprise one roll which is a polytetrafluoroethylene covered drum and a second roll which is a silicone rubber covered drum. The silicone rubber covered drum may be covered with a polytetrafluoroethylene sleeve.

Further inventive features of the present process and apparatus reside in a method and means for pretreatment of the thermoplastic film and/or substrate prior to or during the laminating operation or post-treatment of the laminate in order to lend further decorative and/or utilitarian features thereto. These features include such physical operations on the laminate or its component layers as post-heating, edge folding, texture and register embossing, prestressing, sandblasting, ink embossing, metalizing, flocking, and encapsulation.

The present invention represents a great improvement over the prior art through its versatility, economy and production of superior laminates which strongly resist delamination. The versatility of the present invention is demonstrated through its production of double or multi-ply laminates. Any thickness of laminate may be produced by simply controlling the necessary heat and pressure. And, the invention is not limited to any one plastic material or substrate.

The instant process is highly economical inasmuch as it is waste and trim free and since the simplicity of the apparatus results in low capital and maintenance expenditures. The very nature of the process, dry lamination, eliminates the use of expensive substrate primers which are often required to enhance bonding and increase operating line speed.

The instant invention also results in the production of superior laminates highly resistant to delamination because of use in the present process of a combination of flexible and inflexible nip rolls having surface tensions approximately one-half the surface tension of the film layer being laminated. Such rolls result in laminate films having high clarity and a desirable mat finish; also, the rolls result in better bonding and higher strength, especially in the case of perforate films and/or substrates. A further added advantage of the present invention which results in superior laminates resides in the dual heating system provided by the apparatus. Such a system is not only flexible but provides accurate control of heating, thus yielding laminates of high quality at an increased rate of production.

For a fuller understanding of the nature and objects of the present invention, reference should be had to the following detailed disclosure taken in connection with the accompanying drawings wherein is shown schematically three embodiments of the present invention.

Figure 3:
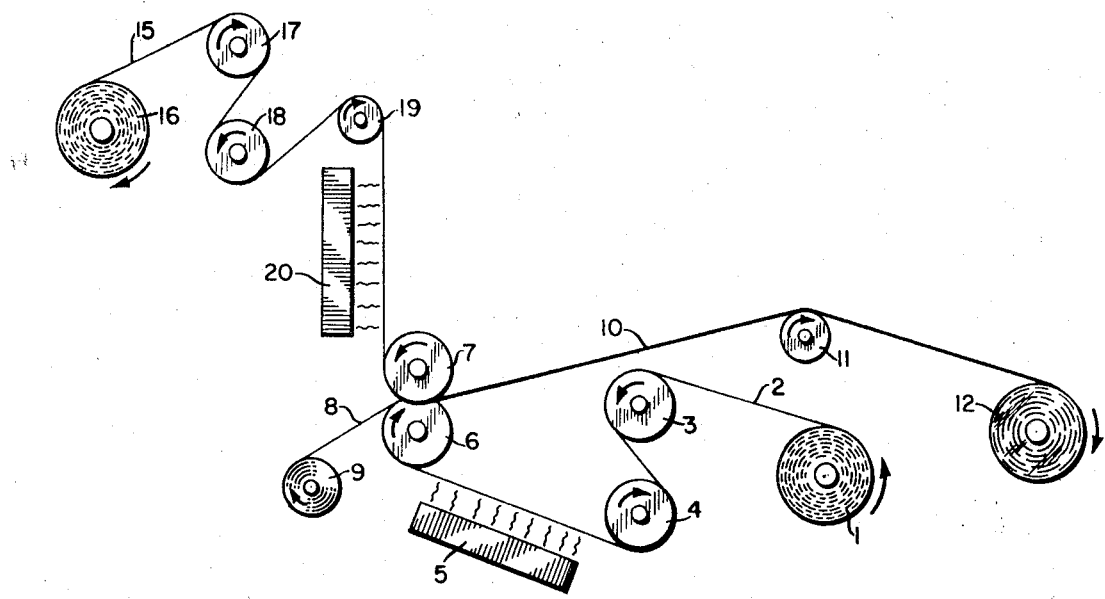

FIG. 3 discloses a third embodiment for the production of a substrate-film-substrate laminate.

In the drawings roll 1 is a roll of substrate; it is commonly referred to as a substrate unwind roll. Substrate 2 may be paper, paperboard, fabric, or metal foil, or any equivalent substance. The substrate may be either continuous or perforate. The perforate nature of the substrate may arise from holes in the substrate or from simply the use of a moderate or very broad weave fabric. The substrate should be generally flat but may bear any of numerous varieties of texture or register embossings. Rolls 3 and 4 are heated, preferably with steam. Generally, it is preferred not to use steam of over 125 psig maximum pressure. However, a wide range of steam pressure is suitable. The substrate 2 may be further heated by an additional unit such as heater 5 which is desirably an infrared heater. Other radiation type heaters may be suitably employed. However, if an infrared heater is employed, the infrared wave length should be such as to be in the first absorption spectra of the substrate, e.g., in the case of paper, 1.7 to 2.2 microns.

Rolls 6 and 7 are nip rolls which are preferably steam heated. Roll 6 desirably has a flexible surface. Such a flexible surface may be realized by covering a steel drum with silicone rubber. Also, if desired, the silicone rubber may be covered with a polytetrafluoroethylene ("Teflon") sleeve. Nip roll 7, preferably a Teflon coated steel drum, is relatively inflexible.

Thermoplastic film 8 is provided from film unwind roll 9. A wide variety of thermoplastics are suitable for use in the present invention. Among such thermoplastics are polyethylene (low, medium and high density), polypropylene, polyvinylidene chloride, and polyvinyl chloride. Laminate 10, formed by heat and pressure from the film and substrate layers, is withdrawn from between nip rolls 7 and 6. Such laminate may desirably pass over roll 11 which may be a cooling roll. The laminate is then wound upon roll 12.

Figure 1:
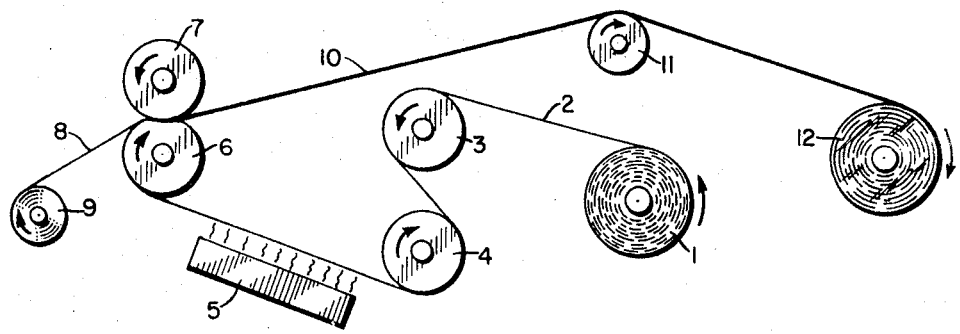
FIG. 1 shows a first embodiment wherein a film-substrate laminate is being produced.
Figure 2:
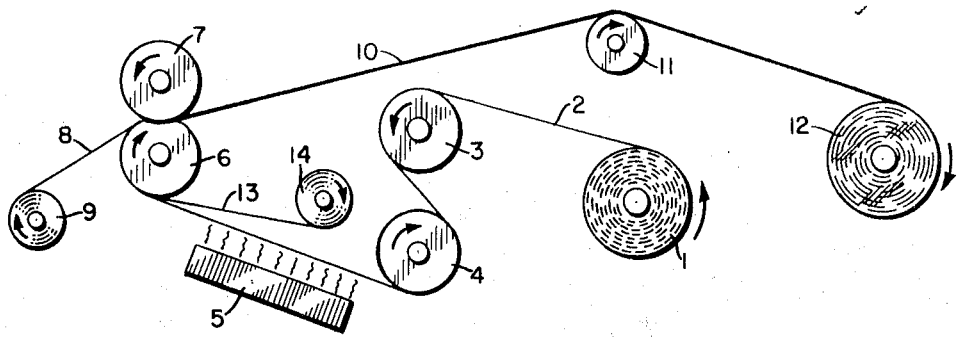
FIG. 2 is drawn to a second embodiment wherein a film-substrate-film laminate is being produced.

In a second embodiment of the invention as shown in FIG. 2 film layer 13 is unwound from roll 14. The three layers — film 13, substrate 2, and film 8 — are passed through the nip section formed by rolls 6 and 7 to produce a three-layered laminate. The versatility of the present invention is here readily apparent since only film 13 and roll 14 need be added to the apparatus of FIG. 1.

In a third embodiment of the invention as shown in FIG. 3 substrate 15 is unwound from roll 16 and preheated by passing over steam heated rolls 17 and 18 and past heater 20, comparable respectively to steam heated rolls 3 and 4 and heater 5. Three layers — substrate 2, film 8, and substrate 15 — are passed through the nip section formed by rolls 6 and 7 to form a substrate-film-substrate laminate. Again the versatility of the present invention is evident inasmuch as the substrate unwind and preheat apparatus is simply duplicated and added to the basic apparatus of FIG. 1.

An especially inventive feature utilized in each of the above embodiments lies in the use of at least two nip rolls, the surface of one being relatively flexible and the surface of the other being relatively inflexible. When the surface of the inflexible roll is pressed into the surface of the flexible roll, a relatively wide area of contact is established between the two rolls, which area is known as a nip section. According to the practice of the present invention, the two abutting nip rolls are pressed together with a force sufficient to form a pressure of about 20 psig to about 80 psig at the nip section. The relatively wide nip section at this pressure forms an excellent means for pressing the various layers of the composite together to form a laminate. Due to the flexibility of the one roll, desired irregular surfaces in the film or substrate are not substantially flattened. Also, in the case of perforate films or substrates, the flexible roll by conforming to such perforations forms a more perfect bond between the laminate layers. By the use of this combination of rolls it is possible to achieve a wide area of contact at a steady pressure without pinching the laminate. This allows the formation of laminates of uniform strength characteristics. Also, the surface tension of the Teflon roll is such that it leaves thermoplastic film with high clarity and gives the film a desirable matte finish. Teflon has a surface tension of 18 dynes per centimeter. Its surface tension is desirably approximately one-half that of the thermoplastic film. The flexible roll is of a hardness of approximately 90 durometers; such hardness may be found in silicone rubber. This rubber roll may further be covered with a relatively thin sleeve of Teflon to provide desirable release characteristics when two outside layers of thermoplastic film are utilized to form the laminate. If the outside layer is a substrate layer, it is of course not always necessary to employ a Teflon sleeve. The flexible driving roll must be deformable under given conditions of temperature and pressure sufficient to produce at least 0.5 square inches per inch of nip. Thus, pressure is regulated within the nip section such that it varies within the range of about 20 psig to about 80 psig. Both nip rolls are desirably heated. The temperature of the nip rolls generally varies from about 150° F. to about 400° F. Temperature of course depends upon the nature and quantity of the materials being laminated.

While the preceding describes the basic embodiments of the invention, there are further modifications which will be described herebelow. In general these modifications fall into two categories, first, physical alteration of laminates without addition of third materials thereto and, secondly, physical alteration of laminates by addition of third materials thereto.

First category alterations to laminates or the composite layers of laminate include post-heating, edge folding, texture embossing, register embossing, prestressing and sandblasting. These operations are preferably performed in conjunction with or during the lamination operation as this permits maximum versatility and economical operation of the entire apparatus.

Post-heating of laminates is performed, generally, just subsequent to forming laminates in the nip section. Thus, residual heat in the laminate reduces heating requirements substantially. Infrared heaters or other radiation type heaters may be conveniently used for adding heat for post-heating operations. Heating of laminates improves the gloss of exterior thermoplastic film layers and enhances bonding of substrate layers to the thermoplastic film layers. Oven heat generally varies from between about 150° F. to about 500° F.

As a further modification, the edges of laminates may be folded inwardly subsequent to lamination to form closed edges by providing guide elements similar to hemmer attachments such as frequently used on sewing machines. When this is done, the edges are rendered completely waterproof so that moisture cannot enter to cause discoloration of the substrate or separation of the layers of the laminate. Residual heat in the laminate just subsequent to the laminating operation aids in edge folding. Additional heat may be employed to seal the folded edges.

Embossing of film laminates is a further operation which may be accomplished without addition of third materials. Embossing techniques utilized in the present invention include texture embossing and register embossing. Each of these techniques desirably takes advantage of the heat necessary for the lamination operation. A textured embossed sheet of material comprises a plurality of different surface areas, each being embossed with straight and parallel lines disposed at angles relative to lines in other areas, so that light reflects at different angles at the different areas, thus giving different or contrasting appearances. In this manner, while two areas of sheet material may be colored identically the net result is that the two like-colored areas have the appearance of different hues because of the different light reflecting patterns produced by different line embossing. The present invention provides as an added refinement a continuous method and apparatus for texture embossing a laminate with a repeating pattern. Texture embossing can be utilized to give a rippling effect to a desired portion of a sheet of materials, to accentuate various elements in a design by angling the valleys and hills of those various elements for direct reflectivity while adjacent elements of the design are angled in other directions for indirect, less brilliant reflection, to make one color serve the function of two or more, to give the appearance of motion through the use of sharply contrasting angles, and to accentuate brand names, produce vignettes or other desired configurations.

According to the present invention, texture embossing may be accomplished either before or after forming the laminate. Due to the resilient nature of one of the laminate forming nip rolls, it is, while still feasible, less desirable to texture emboss with the laminate forming nip rolls since the product is apt to approach the quality of being register embossed — an entirely different operation. Thus, two relatively hard, coacting rolls are provided, one with a desired etched design. Through such coacting rolls may be passed either the laminate or individual film or substrate layers to be continuously impressed with the desired configuration. If film layers are embossed prior to lamination, then such layers should be passed through the laminating nip rolls adjacent to the resilient roll so as not to completely flatten the embossed design. The embossing rolls may be heated and/or additional heaters may be employed to elevate the temperature of the film and/or substrate or laminate. Frequently, all of the necessary heat is provided by the lamination operation. The embossing rolls may desirably be of a low friction material such as Teflon.

Texture embossing must not be confused with register embossing, another aspect of the present invention, wherein mating rolls register to emboss a sheet of material to give a three-dimensional effect thereto. Register embossing apparatus comprises a pair of cooperating rolls having complimentary cavities and ridges formed therein which mesh to continuously emboss the sheet of material passing through the nip of the rolls. Register embossing gives a three-dimensional depth to chosen design elements whereas textured embossing gives much less depth effect while still giving dimensional effects and contrast through its effect on light reflectivity.

In accordance with the present invention, register embossing may be performed simultaneously with lamination or just subsequent thereto. In the case of simultaneous embossing and lamination, the layers of film and substrate are compressed between the resilient and non-resilient nip rolls in such a manner that the outer peripheral surface of the embossing roll pushes the layers of the laminate into the resilient layer of the backup roller to such an extent that the resilient layer of the backup roll tends to flow into the cavities of the embossing roll. Conventional register embossing apparatus utilized after lamination is, as described above, comprised of cooperating rolls both of which have complimentary cavities and ridges which mesh like the teeth of a gear.

Prestressing of one or more substrates and laminating with film layers while in the prestressed condition gives the final laminate properties of either or both increased strength and decorativeness. Such prestressing may be effected by providing tension in the substrate between the unwind roll and nip section. Greater strength is especially provided where multiple substrates are utilized which are united in such a manner as to be stressed in different directions. Decorativeness is provided when the stressed laminate is allowed to relax, much like an elastic band in articles of clothing, to produce ruffles or ripples. Prestressed heat shrinkable materials which may be interwoven with the substrate may thus yield ruffles or ripples when caused to shrink by the heat of lamination.

As a final modification of physical alterations to laminates without addition of third materials thereto, it is noted that when a continuous film surface has an objectionably smooth and glossy surface, it may be roughened by sandblasting to give a dull matte finish. Sandblasting may also be utilized to aid bonding. Desirably sandblasting is carried out while the laminate or film layer is warm with the heat necessary for lamination. It is of course evident that sandblasting can be combined with any of the above described modifications. Or, for that matter, numerous different combinations of the above modifications are within the scope of the present invention which produce unusual and useful decorative laminates.

As above mentioned as a second category of physical modifications which are within the scope of the present invention, physical alteration of laminates may be accomplished by addition of third materials thereto. Such alterations include ink embossing, metalizing, flocking and encapsulation. These operations are preferably performed in conjunction with or during the lamination operation as this permits maximum versatility and economical operation of the entire apparatus.

Prior to ink embossing it is desirable in the case of some thermoplastic films to preactivate the surface. This may be utilized either or both to enhance bonding to another layer or to improve the adherence of a decorative layer thereto such as ink printing. For example, activation of polyethylene is necessary for printing thereon. When printing is performed with inks having nitrocellulose or polyamide bases, polyethylene does not establish a firm bond thereto unless its surface has been activated. According to the present invention, thermoplastic film surfaces may be activated in several ways. It may be desirable to treat the film surface by subjecting it to oxidative treatment either by chemical or physical means. Thus, the film may be treated with sulfuric acid, hot nitric acid, trichloroacetic acid, or chromic acid; with halogens under free radical forming conditions; with isocyanates; by exposure of the surface to ozone; by exposure of the surface to a high voltage electric stress accompanied by corona discharge in the presence of oxygen; by exposure of the surface in the presence of oxygen to ionizing radiation such as ultraviolet, X-, alpha-, beta-, or gamma-radiation, particularly at temperatures above 100° C.; or by exposure of the surface to a flame for a time sufficient to cause superficial oxidation but not long enough to cause distortion of the film. Preferably, the film surface is treated by corona discharge. This is done by impinging a thermoplastic resin body which is to be treated, with a photon discharge generated at ultra high frequency. This forms on the resin body and in the interior of the body double bonds for retaining a polymeric coating. For example, there may be impinged upon the body a photon discharge generated in the range of ½ to 30 megacycles, operating in the range of 3,500 to 55,000 volts at 100 milliamps output. Broadly, the corona treater apparatus of the present invention includes a generator, an electrode, a backup roll (or treater roll), and a dielectric between the electrode and backup roll. The advantages of the corona discharge technique in the present invention include reduced operating costs since it is more expensive to use chemical primers. Benefits are also in reduced equipment expenses. The present equipment installation for corona discharge priming is far less expensive than the cost of an application system, drying hood, and explosion proof wiring needed with solvent based primers. Embossing may be effected before or after lamination. In either case it is performed in conjunction with lamination to reduce film or laminate handling operations and to improve the economy and versatility of the overall process.

Either or both the thermoplastic film and/or substrate may be coated with a metal layer via either a vapor plating or a solution plating technique. Such techniques require heated surfaces and advantageously take advantage of the heat necessary for the lamination operation. When a multilayered thermoplastic film laminate is produced, a mirror-like effect may be produced by forming a metal coating upon one of the film layers. By masking off parts of the substrate or thermoplastic film which is to be coated, with wax, grease, or other material which may be easily removed, a decorative design may be produced when the substrate or film is metal coated by vapor plating or solution plating.

Flocking of thermoplastic film surfaces may be accomplished according to the present invention by preheating the film so as to render it tacky; of course, such preheating reduces the heat requirements for the lamination operation. The surface of the film may be flocked, for example, with short threads to produce a suede-like appearance. Or the film surface might be flocked with Teflon flakes or fibers in order to produce a low friction surface.

It is within the scope of the present invention to encapsulate both particles and bubbles within laminates. Particle encapsulation may be accomplished by preheating one or more thermoplastic film layers to render them tacky at the surface. Over the tacky thermoplastic surface may be sprinkled or otherwise spread a light coating of particles, for example metal flakes, strips or powder. When such thermoplastic film is then laminated with other film and/or substrate, then the particles remain encapsulated in the laminate produced. Bubble encapsulation may be accomplished by spreading a solid particle blowing agent, such as solid carbon dioxide, upon one or more of the film or substrate surfaces. Such blowing agent should be activatable by the heat of lamination; upon being activated it leaves a small bubble of gas within the laminate, thus producing a decorative effect.

As will be shown by the following examples, the present invention optimizes the adhesion of thermoplastic films to paper substrates through the use of specific laminating conditions. When discussing adhesion, it is customary to distinguish between (1) a bond established by mechanical interlocking of the resin with the structure of the substrate and (2) a specific or chemical adhesion. There are some generalizations, in particular about paper as a substrate, which may be here noted, e.g., in dry lamination adhesion increases as the paper smoothness and density increase. Compressibility of the paper, pretreatment of the paper, nip pressure, and point of contact of the film with the paper all have some bearing on the intimacy of the contact of the film with the substrate. The difference in the adhesion level between various papers generally reflects the differences in the surface physical properties of the paper such as surface roughness and surface porosity. In the following examples conditions are optimized in relation to particular thermoplastic films for producing film-paper laminates which are highly resistant to delamination.

Having thus set forth the invention, the following examples are offered as being more definitive thereof but not as limiting thereto. The film layers of Examples I–V were bonded to 50 lb/ream natural kraft paper substrate using the apparatus shown schematically in FIG. 1.

| Example No. | Film | Nip rolls 6 and 7 | | Substrate¹ temperature at nip roll | | Nip pressure in p.s.i. | |
|---|---|---|---|---|---|---|---|
| | | Max. | Min. | Max. | Min. | Max. | Min. |
| I | Polyethylene: | | | | | | |
| | Low density | 275 | 210 | 300 | 250 | 80 | 20 |
| | Medium density | 325 | 275 | 350 | 300 | 80 | 20 |
| | High density | 375 | 325 | 400 | 350 | 80 | 20 |
| II | Polyoropylene: | | | | | | |
| | Heat sealable² | 300 | 250 | 300 | 275 | 80 | 20 |
| | Regular | 400 | 300 | 425 | 325 | 80 | 20 |
| III | Polyvinylidene chloride | 350 | 320 | 375 | 340 | 80 | 20 |
| IV | Polyvinyl chloride | 375 | 325 | 400 | 350 | 80 | 20 |
| V | Ionomer³ | 185 | 150 | 200 | 160 | 80 | 20 |

¹ Surface temperature of substrate to contracted with thermoplastic film.
² Coated with nitrocellulose.
³ Monovalent and bivalent metallic salts of ethylene-acrylic acid copolymers ("Surlin").

EXAMPLE VI

Production speeds following the curve $Y=-10.89 \times +493.65$ ft/min were obtained by running the thermal laminator apparatus of FIG. 1 under the following conditions:
1. Temperature at nip rolls:
   250° F. held constant — non-resilient roll,
   270° F. held constant — resilient roll;
2. Substrate — 50 lb/ream natural kraft preheated to 270° F.;
3. Thermoplastic film — various thicknesses of Almar 21 film (polyethylene blown film, 0.916 density, melt index 5);
4. Bond strength — 90 percent;
5. Nip pressure — 20 lb/linear inch (40 psi);
6. For the curve:
   $Y=-10.89 \times +493.65$ ft/min
   $Y$ = machine speed in ft/min
   $X$ = weight of Almar 21 film in lbs/3,000 ft².

A maximum speed of 415 ft/min was obtained with ½ mil film (7.2 lb/3,000 ft²), and a minimum speed of 180 ft/min was obtained with 2 mil film (28.8 lb/3,000 ft²).

Production speeds of 450 ft/min were achieved with 60 percent bond using a 1 mil Almar 21 film, 50 lb/ream paper using conditions cited in (1) through (6) supra.

It will be understood that while there have been given herein certain specific examples of the practice of this invention, it is not intended thereby to have this invention limited to or circumscribed by the specific details of materials, proportions, or conditions herein specified, other than where explicitly stated, in view of the fact that this invention may be modified according to individual preference or conditions without necessarily departing from the spirit of the disclosure and the scope of the appended claims.

We claim:

1. A method for continuously thermally bonding layers of material together to form a laminate including at least one layer of thermoplastic film selected from the group consisting of polyethylene, polypropylene, polyvinylidene chloride and polyvinyl chloride and at least one layer of substrate formed of material dissimilar to said thermoplastic film comprising:
   A. substantially uniformly preheating the entire thickness of the film,
   B. providing at least two parallel and abutting nip rolls, the surface of one of the two abutting rolls being relatively resilient silicone rubber and the surface of the other of said two abutting being relatively rigid, with one or both of said two abutting rolls being covered with polytetrafluoroethylene,
   C. pressing at least two of the abutting rolls together so as to form a nip section whereat exists a pressure of from about 20 to about 80 pounds per square inch gauge,
   D. counter-rotating said abutting rolls, and
   E. passing the layers of film and substrate through said nip section, whereby the layers are thermally bonded and a laminate is formed.
2. The method of claim 1 wherein:
   A. the film is low density polyethylene,
   B. the nip rolls are maintained at a temperature of from about 210° F. to about 275° F.,
   C. the substrate is kraft paper, and
   D. substantially just prior to passing through said nip section the paper is heated to a temperature of from about 250° F. to about 300° F.
3. The method of claim 1 wherein said laminate is next heated to a temperature of from about 150° F. to about 500° F. whereby gloss of the film is enhanced and bonding of the substrate to the film is improved.
4. The method of claim 1 wherein the uncooled surface of at least one layer of the composite is metal coated by vapor plating or solution plating.
5. The method of claim 1 wherein the uncooled surface of at least one layer of thermoplastic film is flock coated.
6. The method of claim 1 wherein:
   A. the film is medium density polyethylene,
   B. the nip rolls are maintained at a temperature of from about 275° F. to about 325° F., and
   C. the substrate substantially just prior to passing through said nip section is at a temperature of from about 300° F. to about 350° F.
7. The method of claim 1 wherein:
   A. the film is high density polyethylene,
   B. The nip rolls are maintained at a temperature of from about 325° F. to about 375° F., and
   C. the substrate substantially just prior to passing through said nip section is at a temperature of from about 350° F. to about 400° F.
8. The method of claim 1 wherein:
   A. the film is nitrocellulose coated polypropylene,
   B. the nip rolls are maintained at a temperature of from about 250° F. to about 300° F., and
   C. the substrate substantially just prior to passing through said nip section is at a temperature of from about 275° F. to about 300° F.
9. The method of claim 1 wherein:
   A. the film is polypropylene,
   B. the nip rolls are maintained at a temperature of from about 300° F. to about 400° F., and
   C. the substrate substantially just prior to passing through said nip section is at a temperature of from about 325° F. to about 425° F.
10. The method of claim 1 wherein:
    A. the film is polyvinylidene chloride,
    B. the nip rolls are maintained at a temperature of from about 320° F. to about 350° F., and
    C. the substrate substantially just prior to passing through said nip section is at a temperature of from about 340° F. to about 375° F.
11. The method of claim 1 wherein:
    A. the film is polyvinyl chloride,
    B. the nip rolls are maintained at a temperature of from about 325° F. to about 375° F., and
    C. the substrate substantially just prior to passing through said nip section is at a temperature of from about 350° F. to about 400° F.

* * * * *